(12) United States Patent
Shimura

(10) Patent No.: US 9,897,964 B2
(45) Date of Patent: Feb. 20, 2018

(54) POWER SUPPLY APPARATUS AND IMAGE FORMING APPARATUS

(71) Applicant: CANON KABUSHIKI KAISHA, Tokyo (JP)

(72) Inventor: Yasuhiro Shimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/249,848

(22) Filed: Aug. 29, 2016

(65) Prior Publication Data

US 2017/0075289 A1 Mar. 16, 2017

(30) Foreign Application Priority Data

Sep. 11, 2015 (JP) ................................. 2015-179614

(51) Int. Cl.
| | | |
|---|---|---|
| *G03G 15/00* | (2006.01) | |
| *H02M 5/257* | (2006.01) | |
| *H02M 1/00* | (2006.01) | |
| *H02M 1/32* | (2007.01) | |

(52) U.S. Cl.
CPC ............ *G03G 15/80* (2013.01); *H02M 5/257* (2013.01); *H02M 2001/0032* (2013.01); *H02M 2001/0048* (2013.01); *H02M 2001/322* (2013.01); *Y02B 70/1491* (2013.01); *Y02B 70/16* (2013.01)

(58) Field of Classification Search
CPC .............................. G03G 15/80; H02M 5/257; H02M 2001/322; H02M 2001/0032; H02M 2001/0048; Y02B 70/16; Y02B 70/149

See application file for complete search history.

(56) References Cited

U.S. PATENT DOCUMENTS

| | | | | |
|---|---|---|---|---|
| 4,437,134 A | * | 3/1984 | Dupraz | ................. G01R 15/06 324/111 |
| 8,761,631 B2 | | 6/2014 | Shimura | |
| 8,937,471 B2 | * | 1/2015 | Kobayashi | ............. H02M 1/32 320/166 |
| 9,112,419 B2 | * | 8/2015 | Nate | ................. H02M 3/33507 |
| 9,252,669 B2 | * | 2/2016 | Nate | .................... H02M 3/335 |
| 9,735,665 B2 | * | 8/2017 | Balakrishnan | .......... H02M 1/32 |

(Continued)

FOREIGN PATENT DOCUMENTS

| | | |
|---|---|---|
| JP | 2007-212503 A | 8/2007 |
| JP | 4446136 B2 | 4/2010 |
| JP | 2013-123348 A | 6/2013 |

OTHER PUBLICATIONS

U.S. Appl. No. 15/174,222, filed Jun. 6, 2016. Applicant: Yasuhiro Shimura, et al.

*Primary Examiner* — G.M. Hyder
(74) *Attorney, Agent, or Firm* — Fitzpatrick, Cella, Harper & Scinto

(57) ABSTRACT

The power supply apparatus includes first line and lines to each of which an AC voltage is input, a first capacitor arranged between the first and secondary lines, a voltage detection unit configured to detect the AC voltage, a conversion element to be connected to the first line or the secondary line, the conversion element being configured to convert the AC voltage to be input to the first line or the secondary line into a current corresponding to the AC voltage, a switch configured to switch between connection and disconnection of the voltage detection unit and the conversion element, and a control unit configured to control the voltage detection unit and the switch.

14 Claims, 5 Drawing Sheets

(56) References Cited

U.S. PATENT DOCUMENTS

| | | | |
|---|---|---|---|
| 2005/0052886 A1* | 3/2005 | Yang | H02M 1/36 363/49 |
| 2011/0025278 A1* | 2/2011 | Balakrishnan | H02M 1/32 320/166 |
| 2011/0068751 A1* | 3/2011 | Lin | H02M 1/126 320/166 |
| 2011/0103104 A1* | 5/2011 | Zhan | H02M 3/33507 363/21.17 |
| 2011/0122668 A1* | 5/2011 | Lo | H02J 9/061 363/126 |
| 2011/0249476 A1* | 10/2011 | Chen | H02H 1/0007 363/52 |
| 2011/0305051 A1* | 12/2011 | Yang | H02M 1/36 363/49 |
| 2012/0007567 A1* | 1/2012 | Disney | H02M 1/44 320/166 |
| 2012/0008354 A1* | 1/2012 | Tang | H02M 1/32 363/126 |
| 2012/0044723 A1* | 2/2012 | Lin | H02M 3/33507 363/21.13 |
| 2012/0112564 A1* | 5/2012 | Wu | H02M 1/44 307/326 |
| 2012/0125917 A1* | 5/2012 | Aoki | H05B 6/666 219/620 |
| 2012/0134185 A1* | 5/2012 | Shin | H02M 7/46 363/44 |
| 2012/0153930 A1* | 6/2012 | Goto | H02M 1/08 323/311 |
| 2012/0313616 A1* | 12/2012 | Lee | H02M 1/126 323/312 |
| 2013/0057231 A1* | 3/2013 | Luthi | H02M 1/36 323/210 |
| 2013/0076315 A1* | 3/2013 | Liu | H02M 1/32 320/166 |
| 2013/0148998 A1* | 6/2013 | Shimura | G03G 15/80 399/88 |
| 2013/0170261 A1* | 7/2013 | Lee | H02H 7/16 363/126 |
| 2013/0188401 A1* | 7/2013 | Jin | H02H 3/14 363/21.17 |
| 2013/0188405 A1* | 7/2013 | Jin | H02M 1/32 363/49 |
| 2013/0195497 A1* | 8/2013 | Shimura | G03G 15/80 399/88 |
| 2013/0242626 A1* | 9/2013 | Li | H02M 1/36 363/50 |
| 2013/0335038 A1* | 12/2013 | Lee | H02M 1/126 320/166 |
| 2014/0036561 A1* | 2/2014 | Sakurai | H02M 7/217 363/126 |
| 2014/0062421 A1* | 3/2014 | Jeong | H02J 3/00 320/166 |
| 2014/0233285 A1* | 8/2014 | Nishijima | H02M 7/217 363/62 |
| 2014/0307486 A1* | 10/2014 | Huang | H02M 3/33507 363/21.16 |
| 2015/0180324 A1* | 6/2015 | Hsu | H02M 7/06 363/89 |
| 2015/0288286 A1* | 10/2015 | Chu | H02M 3/33507 363/21.12 |
| 2016/0036249 A1* | 2/2016 | Saji | H02M 3/33507 320/160 |

* cited by examiner

POWER SUPPLY APPARATUS AND IMAGE FORMING APPARATUS

BACKGROUND OF THE INVENTION

Field of the Invention

The present invention relates to a power supply apparatus, which is suitable for controlling a thermal fixing device mounted in an image forming apparatus such as an electrophotographic copying machine or a printer.

Description of the Related Art

In an image forming apparatus such as an electrophotographic copying machine or a printer, there is provided a fixing device configured to heat and fix an unfixed toner image onto a recording material to fix the unfixed toner image on the recording material. In a power supply apparatus configured to control supply of power to the fixing device, there has been widely used a method of subjecting AC voltage, which is supplied from an AC power supply, to a phase control using a bidirectional thyristor (hereinafter referred to as "triac") or the like. As related arts associated with major functions of the above-mentioned power supply apparatus, the following technologies have been proposed. For example, in Japanese Patent Application Laid-Open No. 2007-212503, there is proposed a technology of detecting a current effective value of current which flows to the fixing device, to thereby detect power supplied to the fixing device. Further, for example, in Japanese Patent Application Laid-Open No. 2013-123348, there is proposed, in regard to a reference timing (hereinafter referred to as "zero cross") during a phase control for power supplied from an AC power supply, a technology of detecting an accurate zero cross of the AC power supply while reducing power consumption of a circuit for detecting a zero cross. Yet further, for example, in Japanese Patent No. 4446136, there is proposed a technology associated with a discharging technology for an across-the-line capacitor (hereinafter referred to as "X-capacitor") arranged between two lines of an AC power supply. Specifically, in Japanese Patent No. 4446136, there is disclosed a technology of detecting a state in which a power supply cable is drawn out from the AC power supply and discharging an electric charge charged in the X-capacitor, to thereby reduce power consumption during a normal time of a power supply apparatus.

With regard to the power supply apparatus configured to control supply of power to the fixing device, there has been a demand for reduction of power consumption at low cost. Therefore, there has been a problem of achieving the above-mentioned three functions including detection of the amount of power supplied to the fixing device, detection of the accurate zero cross of the AC power supply, and discharge of the electric charge charged in the X-capacitor, with a small-scale circuit configuration.

SUMMARY OF THE INVENTION

Power consumption can be reduced with a simple circuit configuration.

According to one embodiment of the present invention, there is provided an power supply apparatus, including, a first line and a secondary line to each of which an AC voltage is input, a first capacitor arranged between the first line and the secondary line, a voltage detection unit configured to detect the AC voltage, a conversion element to be connected to the first line or the secondary line, the conversion element being configured to convert the AC voltage to be input to the first line or the secondary line into a current corresponding to the AC voltage, a switch configured to switch between connection and disconnection of the voltage detection unit and the conversion element, and a control unit configured to control the voltage detection unit and the switch, in which when the control unit controls the switch to connect the voltage detection unit and the conversion element to form a current path between the first line and the secondary line through the voltage detection unit and the conversion element, the voltage detection unit detects the AC voltage between the first line and the secondary line to discharge an electric charge charged in the first capacitor through the current path.

Further, according to one embodiment of the present invention, there is provided an image forming apparatus, including an image forming unit configured to form an image on a recording material, a fixing unit configured to fix on the recording material the image formed on the recording material, and a power supply apparatus configured to supply power to the fixing unit, the power supply apparatus including a first line and a secondary line to each of which an AC voltage is input; a first capacitor arranged between the first line and the secondary line, a voltage detection unit configured to detect the AC voltage, a conversion element to be connected to the first line or the secondary line, the conversion element being configured to convert the AC voltage to be input to the first line or the secondary line into a current corresponding to the AC voltage, a switch configured to switch between connection and disconnection of the voltage detection unit and the conversion element; and a control unit configured to control the voltage detection unit and the switch, in which when the control unit controls the switch to connect the voltage detection unit and the conversion element to form a current path between the first line and the secondary line through the voltage detection unit and the conversion element, the voltage detection unit detects the AC voltage between the first line and the secondary line to discharge an electric charge charged in the first capacitor through the current path.

Further features of the present invention will become apparent from the following description of exemplary embodiments with reference to the attached drawings.

DESCRIPTION OF THE EMBODIMENTS

Now, embodiments of the present invention are described in detail with reference to the drawings.

A first embodiment of the present invention is described.

[Configuration of Image Forming Apparatus]

Figure 1:
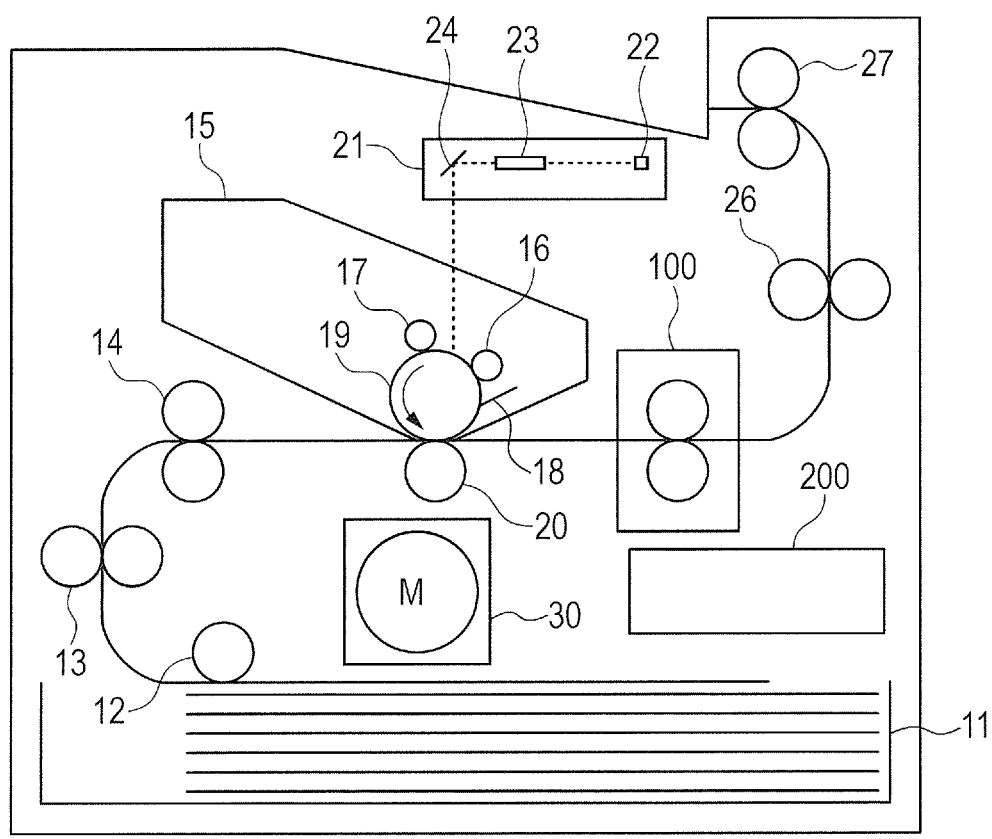
FIG. 1 is a view for illustrating a schematic configuration of image forming apparatus according to a first embodiment and a second embodiment of the present invention.

FIG. 1 is a sectional view for illustrating a schematic configuration of a monochromatic printer, which is one example of an electrophotographic image forming apparatus and is configured to perform image formation using black toner. In FIG. 1, only one of recording sheets serving as recording materials stacked on a sheet feeding cassette 11 is fed by a pickup roller 12 from the sheet feeding cassette 11 and conveyed by sheet feeding rollers 13 to registration rollers 14. Then, the recording sheet having been conveyed to the registration rollers 14 is further conveyed to a process cartridge 15 at a predetermined timing. The process cartridge 15 serving as an image forming unit is collectively constructed by a charging device 16, a developing roller 17 serving as a developing unit, a cleaner 18 serving as a cleaning unit, and a photosensitive drum 19 serving as a photosensitive member. Then, through a series of well-known electrophotographic processes described below, an unfixed toner image is formed on the recording sheet having been conveyed. The photosensitive drum 19 is uniformly charged on its surface by the charging device 16 and thereafter exposed with light based on an image signal by a scanner unit 21 serving as an exposure unit. Laser light emitted from a laser diode 22 in the scanner unit 21 is deflected by a rotary polygon mirror 23 and passes through a reflection mirror 24 to scan the photosensitive drum 19, to thereby form a latent image on the photosensitive drum 19. The developing roller 17 causes toner to adhere on the latent image formed on the photosensitive drum 19, with the result that the latent image is formed into a visible toner image. Then, the toner image on the photosensitive drum 19 is transferred by the transfer roller 20 onto the recording sheet having been conveyed from the registration rollers 14. The recording sheet having the toner image transferred thereon is conveyed to a fixing device 100. The unfixed toner image on the recording sheet is heated and pressed by the fixing device 100 to be fixed on the recording sheet. Then, the recording sheet is delivered to an outside of the image forming apparatus by intermediate sheet delivery rollers 26 and sheet delivery rollers 27, and then the series of printing operations is terminated.

A motor 30 gives a drive force to a drive system for each device, such as the fixing device 100. Further, supply of power to the fixing device 100 is controlled by a phase control, a wave number control, or a control method over a plurality of cycles including a phase control waveform, based on a zero cross of an AC power supply 201 (see FIG. 2) described later. A power supply apparatus 200 is a power supply apparatus which is used in an image forming apparatus and connected to the AC power supply 201, e.g., a commercial power supply, through a power supply cable (not shown). An image forming apparatus to which the power supply apparatus 200 is applicable is not limited to the image forming apparatus illustrated in FIG. 1 and may be an image forming apparatus, e.g., a color printer including a plurality of image forming units. Further, the image forming apparatus may further include a primary transfer portion configured to transfer a toner image on the photosensitive drum 19 onto an intermediate transfer belt and a secondary transfer portion configured to transfer the toner image on the intermediate transfer belt onto a recording sheet.

[Configuration of Power Supply Apparatus]

Figure 2:
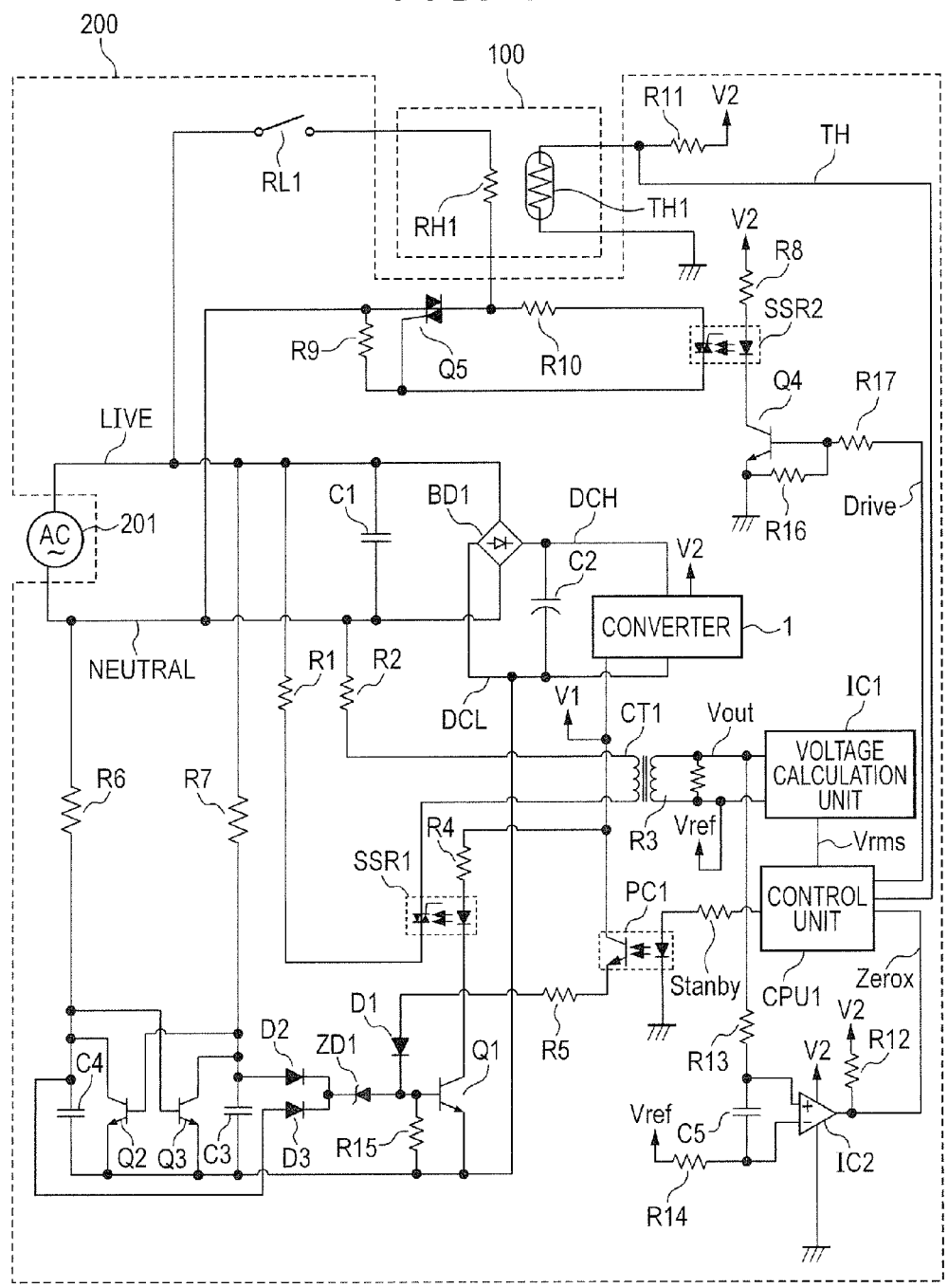
FIG. 2 is a diagram for illustrating a circuit configuration of a power supply apparatus according to the first embodiment.

FIG. 2 is a diagram for illustrating a circuit configuration of the power supply apparatus 200 according to the first embodiment. The AC power supply 201 (denoted by "AC" in FIG. 2) outputs AC voltage between a live-side line (denoted by "LIVE" in FIG. 2) serving as a secondary line and a neutral-side line (denoted by "NEUTRAL" in FIG. 2) serving as a first line. The AC voltage input by the AC power supply 201 is subjected to full-wave rectification by a bridge diode BD1 and smoothed by an electrolytic capacitor C2. In an electric potential of DC voltage smoothed by the electrolytic capacitor C2, a high electric potential side is denoted by "DCH", and a low electric potential side is denoted by "DCL".

A converter 1 is an insulated DC/DC converter serving as a power supply unit. The converter 1 is configured to receive, on a primary side, voltage charged in the capacitor C2 and generate, on a secondary side, voltage V2 which is a predetermined DC voltage. Then, the generated voltage V2 is supplied to each of devices in the image forming apparatus, such as drive systems and control systems serving as external loads. Further, the converter 1 is configured to generate and output voltage V1, which is DC voltage, to an auxiliary winding (not shown) on the primary side. The capacitor C1 is an X-capacitor serving as a first capacitor and is a capacitor arranged between the AC lines (between the live-side line and the neutral-side line) for the purpose of removing a noise. Further, a resistor R1 serving as a second resistor is arranged on a current path between the live-side line and a current transformer CT1 described later, and a resistor R2 serving as a first resistor is arranged on a current path between the neutral-side line and the current transformer CT1. The resistors R1 and R2 are voltage detection resistors used to detect input voltage from the AC power supply 201, and are voltage-current conversion elements configured to convert the input voltage from the AC power supply 201 into a current. Further, as will be described later, the resistors R1 and R2 are also used to discharge an electric charge charged in the X-capacitor C1. For example, one resistor may be used by removing the resistor R2 from the resistors R1 and R2. In this embodiment, the two resistors R1 and R2 are used to prevent a through-current in a case of a short-circuit failure in any one of the resistors R1 and R2. Further, the resistor R1 is to be connected to the live-side line, and the resistor R2 is to be connected to the neutral-side line, to thereby reduce a normal noise applied to the current transformer CT1 from the live-side line and the neutral-side line. When the normal noise applied to the current transformer CT1 is reduced, accuracy in voltage detection with use of the current transformer CT1 can be enhanced.

A control unit CPU1 (hereinafter simply referred to as "CPU1") is used as a control unit for the power supply apparatus 200. Further, the CPU1 is also used to control the image forming apparatus described with reference to FIG. 1. The control by the CPU1 is described later in detail.

[Circuit Operation in Second State of Power Supply Apparatus]

First, a circuit operation in a second state is described. The second state represents a standby state in which the power supply apparatus 200 can supply power to the fixing device 100, or a state in which voltage of the AC power supply 201 can be detected by the current transformer CT1 described later during printing on a recording material by the image forming apparatus. Under the second state, the CPU1 sets a standby signal at a high level. With this, a secondary-side light emitting diode of a photocoupler PC1 is brought into a conduction state to emit light, and a phototransistor on a primary side of the photocoupler PC1 is brought into the conduction state. Then, the voltage V1 generated in the auxiliary winding of the converter 1 causes current to flow from the auxiliary winding of the converter 1 to a base terminal of a transistor Q1 through the phototransistor on the primary side of the photocoupler PC1, a resistor R5, and a diode D1. As a result, the transistor Q1 is brought into the conduction state. A resistor R15 is connected between the base terminal and an emitter terminal of the transistor Q1. When the transistor Q1 is brought into the conduction state, current flows to a resistor R4, and hence a light emitting diode on a secondary side of a phototriac coupler SSR1 (hereinafter referred to as "triac coupler SSR1") serving as a switching unit is brought into the conduction state to emit light. With this, a primary-side triac of the triac coupler SSR1 is brought into the conduction state, and hence a current path is formed between the live-side line and the neutral-side line by the resistor R1, the primary-side triac of the triac coupler SSR1, the current transformer CT1, and the resistor R2.

The resistor R2 has one end connected to the neutral-side line and another end connected to one end of the primary winding of the current transformer CT1. Meanwhile, the resistor R1 has one end connected to the live-side line and another end connected to the primary-side triac of the triac coupler SSR1. Further, another end of the primary winding of the current transformer CT1 to which the resistor R2 is connected is connected to the primary-side triac of the triac coupler SSR1. The resistors R1 and R2 are connected in series through the current transformer CT1. As a result, the resistors R1 and R2 each having a predetermined resistance value causes current, which is proportional to an input voltage value (AC voltage value) of input voltage from the AC power supply 201 applied between the live-side line and the neutral-side line, to flow on the primary winding side of the current transformer CT1. Meanwhile, current which is proportional to current on the primary side flows on a secondary winding side of the current transformer CT1, and hence voltage Vout generated in a damping resistor R3 has voltage which is proportional to an input voltage value of input voltage from the AC power supply 201, thereby being capable of detecting input voltage from the AC power supply 201.

In this embodiment, the current transformer CT1 is used as a voltage detection unit for the AC power supply 201. Further, in this embodiment, the triac coupler SSR1 is used as a switching unit configured to connect and cut off a current path from the AC power supply 201 to the current transformer CT1 through the resistors R1 and R2, and the resistors R1 and R2 are used as voltage-current conversion elements.

In FIG. 2, when current flows to the primary side of the current transformer CT1, current which is proportional to the current on the primary side is generated on the secondary side, and the voltage Vout which is output voltage is generated in the damping resistor R3. Then, the voltage Vout and a predetermined reference voltage Vref are input to a voltage calculation unit IC1. In the voltage calculation unit IC1, an average value of a square value of a differential value between the output voltage Vout of the current transformer CT1 and the reference voltage Vref is calculated, to thereby calculate a square value of a voltage effective value of input voltage from the AC power supply 201. Then, the voltage calculation unit IC1 outputs information on the calculated square value of the voltage effective value as a Vrms signal to the CPU1 serving as the control unit. The voltage calculation unit IC1 calculates the square value of the voltage effective value of the input voltage from the AC power supply 201. However, for example, in place of the square value of the voltage effective value, the voltage calculation unit IC1 may calculate a voltage effective value, a voltage peak value, a voltage average value, and the like of input voltage from the AC power supply 201. In this embodiment, in order to calculate the amount of power supplied to the fixing device 100 described later with high accuracy, the voltage calculation unit IC1 calculates the square value of the voltage effective value of input voltage from the AC power supply 201.

(Supply of Power to Fixing Device)

Next, a method of supplying power to a resistor heat generation member RH1 (hereinafter referred to as "heat generation member RH1") serving as a heater portion for the fixing device 100 is described. The CPU1 is configured to control supply of power to the heat generation member RH1 serving as the heater portion for the fixing device 100 in accordance with a drive signal. When the supply of power to the heat generation member RH1 is to be performed, the CPU1 sets the drive signal at a high level. When the supply of power to the heat generation member RH1 is to be stopped, the CPU1 sets the drive signal at a low level. A transistor Q4 is brought into an on-state when the drive signal from the CPU1 is at the high level, and is brought into an off-state when the drive signal is at the low level. Resistors R17 and R16 are resistors configured to drive the transistor Q4.

A secondary-side light emitting diode of a phototriac coupler SSR2 (hereinafter referred to as "triac coupler SSR2") serving as a device configured to secure a creepage distance between the primary and secondary sides is turned on and off by the transistor Q4. Specifically, when the transistor Q4 is brought into the on-state, the secondary-side light emitting diode of the triac coupler SSR2 is brought into the conduction state, and current from the voltage V2 flows through a pull-up resistor R8, thereby causing emission of light. With this, when the primary-side triac of the triac coupler SSR2 is brought into the conduction state, a triac Q5 is brought into the conduction state. Accordingly, a current path (also serving as a power supply path) connecting the live-side line, a relay RL1, the heat generation member RH1, the triac Q5, and the neutral-side line is formed. The triac Q5 maintains the on-state up to a zero cross of the input voltage from the AC power supply 201. Resistors R9 and R10 arranged between the triac Q5 and the primary-side triac of the triac coupler SSR2 are resistors configured to drive the triac Q5. Meanwhile, when the transistor Q4 is brought into the off-state, the secondary-side light emitting diode of the triac coupler SSR2 is brought into the non-conduction state, and the primary-side triac is also brought into the non-conduction state. With this, the triac Q5 is also brought into the non-conduction state, and supply of power from the AC power supply 201 to the heat generation member RH1 is cut off.

A temperature of the heat generation member RH1 of the fixing device 100 is detected by a thermistor TH1. Then, voltage obtained by dividing the voltage V2 by a resistance value of the thermistor TH1, which may vary in accordance with a temperature of the heat generation member RH1 and a resistance value of a resistor R11, is input to the CPU1 as a TH signal. Then, the CPU1 executes, for example, a PI control to calculate a power duty of power to be supplied to the heat generation member RH1 based on a temperature of the heat generation member RH1 detected in accordance with the input TH signal and a target set temperature of the heat generation member RH1. Then, the CPU1 converts the calculated power duty into a control level such as a corresponding phase angle (in the case of the phase control) or a wave number (in the case of the wave number control) and controls on/off states of the transistor Q4 with the drive signal based on the converted control condition. With this, the triac Q5 is controlled, to thereby control supply of power to the heat generation member RH1. Moreover, when the CPU1 has detected through the TH signal that a temperature of the heater portion detected by the thermistor TH1 is equal to or higher than a predetermined temperature due to a failure, such as a short circuit in the triac Q5, the CPU1 controls a relay control circuit (not shown) to bring the relay RL1 into the non-conduction state. The CPU1 cuts off the supply of power to the fixing device 100 in such a manner.

(Calculation of Amount of Power Supplied to Fixing Device)

Next, a method of calculating the amount of power being supplied to the fixing device 100 is described. The amount of power being supplied to the heat generation member RH1 of the fixing device 100 can be determined in accordance with a square value of a voltage effective value calculated by the voltage calculation unit IC1, a resistance value of the heat generation member RH1, and a power duty of power currently being supplied to the fixing device 100. For example, there are provided the voltage effective value of the AC power supply 201 being 100 Vrms, the resistance value of the heat generation member RH1 being 10Ω, and the power duty of power being supplied to the fixing device 100 being 100%. In this case, the power being supplied to the fixing device 100 has a value obtained by dividing a square value of the voltage effective value (=100 Vrms) by the resistance value (=10Ω) of the heat generation member RH1, resulting in a value of 1,000 W (=100 V×100 V×1(=100%)/10Ω). Further, in the case where the power duty of power currently being supplied to the fixing device 100 is 50%, the power being supplied to the fixing device 100 is one-half, that is, 500 W(=100 V×100 V×0.5(=50%)/10Ω).

[Circuit Operation in First State of Power Supply Apparatus]

Next, a circuit operation under a first state is described. The first state represents a power-saving state with suppressed power consumption, such as during a power-off state of the power supply apparatus 200 or during a sleep state of not performing supply of power to the fixing device 100. Under the first state, the CPU1 sets a standby signal to be output to the photocoupler PC1 at a low level. When the standby signal is brought into the low level state, the secondary-side light emitting diode of the photocoupler PC1 is brought into the non-conduction state and prevented from emitting light. As a result, the phototransistor on the primary side of the photocoupler PC1 is also brought into the non-conduction state, and hence current is prevented from flowing to the base terminal of the transistor Q1, thereby bringing the transistor Q1 into the off-state. Thus, the light emitting diode on the secondary side of the triac coupler SSR1 is brought into the non-conduction state and prevented from emitting light, and the primary-side triac of the triac coupler SSR1 is also brought into the non-conduction state. As a result, a state is attained in which current is prevented from flowing to the voltage detection resistors R1 and R2 and the current transformer CT1, and hence power consumption in the voltage detection resistors R1 and R2 can be reduced, thereby being capable of reducing power consumption during the power-off state or the sleep state of the power supply apparatus 200.

[Discharge of X Capacitor]

Meanwhile, when a user draws out a power supply cable (not shown) connecting the AC power supply 201 and the power supply apparatus 200, there is a case where an electric charge is charged in the X-capacitor C1. Thus, in order to prevent the user from being electrified through a touch to a terminal or the like of the power supply apparatus 200, a unit configured to discharge the electric charge charged in the X-capacitor C1 is required. However, the method of always discharging the electric charge in the X-capacitor C1 with use of a resistor or the like may increase power consumption in the power supply apparatus 200. Thus, a discharge determination unit for the X-capacitor C1 is required to perform discharging of the X-capacitor C1 only when necessary. In this embodiment, a method of detecting a state in which DC voltage equal to or higher than a predetermined voltage value is applied to the X-capacitor C1 and performing discharging of the X-capacitor C1 is described. In this embodiment, one example of the method of determining discharging of the X-capacitor C1 is described, and the example does not delimit the scope of the present invention. For example, the method of detecting that the power supply cable (not shown) is drawn out may include a method of using a sensor or the like to detect a state in which a cable connected to the power supply apparatus 200 is drawn out.

(Discharge of X-Capacitor in First State)

First, a method of discharging of the X-capacitor C1 in the case where the power supply cable (not shown) connecting the AC power supply 201 and the power supply apparatus 200 is drawn out under the first state, which is a power-saving state of suppressing power consumption such as during the power-off state or the sleep state of the power supply apparatus 200, is described. When the power supply cable (not shown) is drawn out, and in the case where the state of charge of the X-capacitor C1 is positive (the electric potential of the live-side line is higher than that of the neutral-side line), the capacitor C3 serving as the second capacitor is charged through the resistor R7. When the voltage charged in the capacitor C3 becomes higher than a Zener voltage of a Zener diode ZD1 serving as a detection portion, the Zener diode ZD1 is brought into the conduction state. With this, a base current flows to a base terminal of the transistor Q1 through the diode D2 and the Zener diode ZD1. As a result, the transistor Q1 is brought into the conduction state, and current flows from the voltage V1 to the resistor R4, thereby bringing the light emitting diode on the secondary side of the triac coupler SSR1 into the conduction state to emit light, and bringing the primary-side triac of the triac coupler SSR1 into the conduction state. Consequently, current flows from the live-side line to the neutral-side line through the resistor R1, the current transformer CT1, and the resistor R2, thereby causing the electric charge charged in the X-capacitor C1 to be discharged.

Meanwhile, when the state of charge of the X-capacitor C1 is negative (the electric potential of the live-side line is lower than that of the neutral-side line), a capacitor C4 serving as a third capacitor is charged through a resistor R6. When the voltage charged in the capacitor C4 becomes higher than the Zener voltage of the Zener diode ZD1, the Zener diode ZD1 is brought into the conduction state, thereby causing the base current to flow to the base terminal of the transistor Q1 through the diode D3 and the Zener diode ZD1. As a result, the transistor Q1 is brought into the conduction state, and current flows from the voltage V1 to the resistor R4, thereby bringing the light emitting diode on the secondary side of the triac coupler SSR1 into the conduction state to emit light, and bringing the primary-side triac of the triac coupler SSR1 into the conduction state. Consequently, current flows from the neutral-side line to the live-side line through the resistor R2, the current transformer CT1, and the resistor R1, thereby causing the electric charge charged in the X-capacitor C1 to be discharged.

Next, a method of discharging of the X-capacitor C1 in a normal state, in which the AC power supply 201 and the power supply apparatus 200 are connected through the power supply cable during the power-off state or the sleep state of the power supply apparatus 200, is described.

When the state of charge of the X-capacitor C1 is positive (the electric potential of the live-side line is higher than that of the neutral-side line), a base current flows from the live-side line to the base terminal of the transistor Q2 serving as the second transistor through the resistor R7. With this, the transistor Q2 constructing the second discharging portion is brought into the conduction state, thereby causing the electric charge charged in the capacitor C4 connected in parallel between the collector terminal and the emitter terminal of the transistor Q2 to be discharged. Meanwhile, when the state of charge of the X-capacitor C1 is negative (the electric potential of the live-side line is lower than that of the neutral-side line), a base current flows from the neutral-side line to the base terminal of the transistor Q3 serving as the first transistor through the resistor R6. With this, the transistor Q3 constructing a first discharge unit is brought into the conduction state, thereby causing the electric charge charged in the capacitor C3 connected in parallel between the collector terminal and the emitter terminal of the transistor Q3 to be discharged. As described above, the capacitors C3 and C4 are discharged alternately in every AC cycle of the AC voltage input from the AC power supply 201 (every time positive and negative electric potentials in the live-side line and the neutral-side line are switched). Thus, the electric charge charged in the capacitors C3 and C4 are maintained equal to or lower than the Zener voltage of the Zener diode ZD1, and hence the base current is prevented from flowing to the base terminal of the transistor Q1, thereby maintaining the transistor Q1 in the non-conduction state. In this case, the transistor Q1 is not brought into the conduction state, and hence current is prevented from flowing to the resistors R1 and R2 serving as the voltage detection resistors, thereby being capable of reducing the power consumption in the resistors R1 and R2.

(Discharge of X-Capacitor in Second State)

Next, a method of discharging of the X-capacitor C1 in the second state is described. The second state represents a state in which voltage of the AC power supply 201 can be detected, such as during the standby state of the power supply apparatus 200 or during printing of the image forming apparatus on a recording material. As described above, in this state, a standby signal at a high level is output from the CPU1, thereby bringing the primary-side triac of the triac coupler SSR1 into the conduction state. As a result, a current path is formed between the live-side line and the neutral-side line through the resistor R1, the current transformer CT1, and the resistor R2. With this, the electric charge charged in the X-capacitor C1 is brought into the state of being capable of always discharging through the resistor R1, the resistor R2, and the current transformer CT1.

[Zero Cross Detection]

Next, a method of detecting a zero cross of the AC power supply 201 is described. In this embodiment, in FIG. 2, a non-inverting terminal (+) of a comparator IC2 serving as a zero cross detection unit receives an output voltage Vout of the current transformer CT1, and an inverting terminal (−) receives a reference voltage Vref of the current transformer CT1. Then, the comparator IC2 outputs a Zerox (zero cross) signal, which corresponds to a result of comparison between input voltages of the two terminals, to the CPU1, thereby enabling the CPU1 to detect a zero cross of the AC power supply 201. The zero cross detection utilizes a secondary-side output voltage of the current transformer CT1 and hence is performed when the power supply apparatus 200 is under the standby state. Further, the output voltage Vout of the current transformer CT1 may cause the phase advance with respect to the waveform of the AC voltage of the AC power supply 201 (see waveform 302 of FIG. 3B), and hence is subjected to the phase adjustment by the resistors R13 and R14 and the capacitor C5, and the timing adjustment for the zero cross is performed. Moreover, the resistor R12 connected to the output terminal of the comparator IC2 is a pull-up resistor for the voltage V2.

Figure 3A:
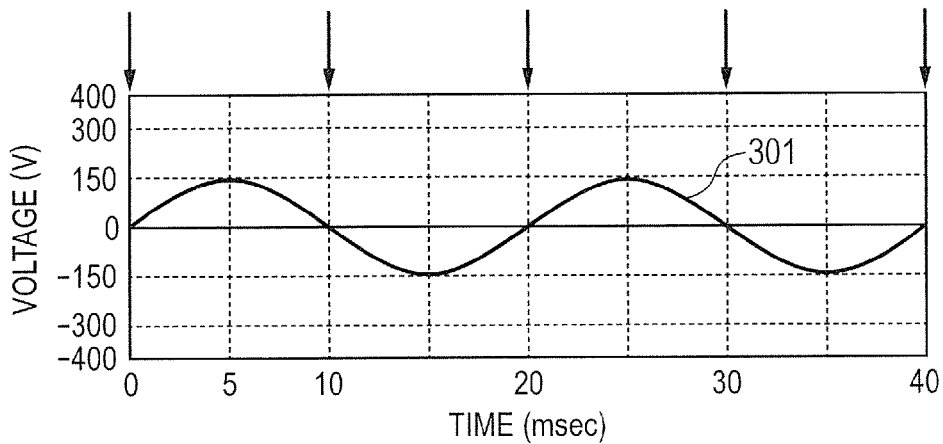
FIG. 3A, FIG. 3B, and FIG. 3C are diagrams for illustrating input and output waveforms of a zero cross detection circuit according to the first embodiment.
Figure 3B:
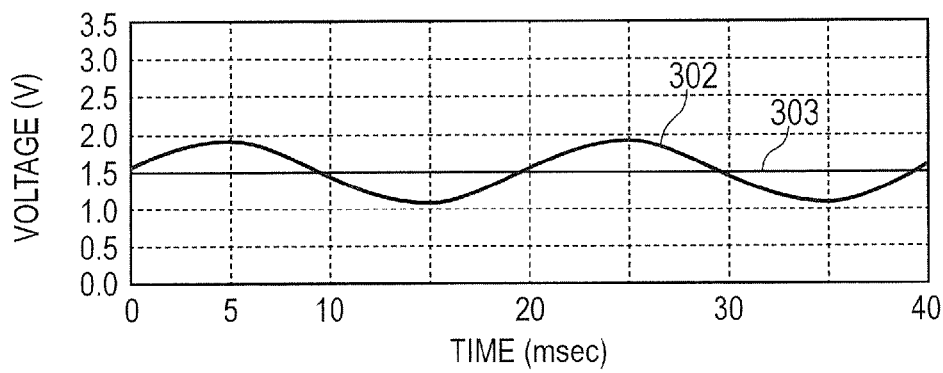
Figure 3C:
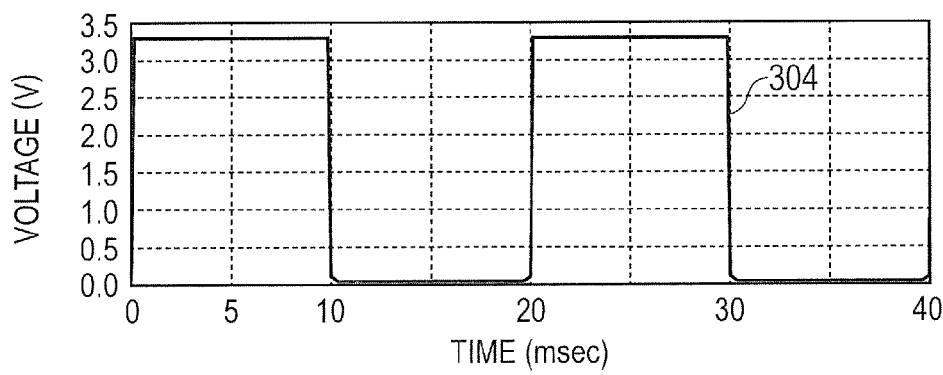

Next, the zero cross waveform is described with reference to the drawings. FIG. 3A, FIG. 3B, and FIG. 3C are diagrams for illustrating voltage waveforms of the AC voltage of the AC power supply 201, the output voltage Vout of the current transformer CT1, and the Zerox signal which is an output of the comparator IC2 according to this embodiment. FIG. 3A is a waveform diagram for illustrating a waveform 301 of an input voltage from the AC power supply 201. In FIG. 3A, the horizontal axis represents time (unit: millimeter per second (msec)), and the vertical axis represents voltage (unit: volt (V)). The vertical axis and the horizontal axis in each of FIG. 3B and FIG. 3C are the same as those of FIG. 3A, and hence description thereof is hereinafter omitted. The waveform 301 represents an input voltage waveform (100 Vrms, 50 Hz) of the AC power supply 201. One cycle is 20 msec, and peak voltages are about 141 V and about −141 V. Further, in FIG. 3A, a zero cross of the AC power supply 201 (timing at which the AC voltage becomes 0 V) is indicated by the arrows.

Next, FIG. 3B is a diagram for illustrating a waveform 302, which is a voltage waveform of the output voltage Vout of the current transformer CT1, and a waveform 303, which is a voltage waveform of the reference voltage Vref of the current transformer CT1. A voltage waveform proportional to an AC voltage value of an AC voltage waveform, which is the waveform 301 of an input voltage from the AC power supply 201 input to the primary side, is output to the waveform 302, which is an output voltage waveform on the secondary side of the current transformer CT1. Further, the reference voltage Vref indicated by the waveform 303 is a predetermined voltage (1.5 V in FIG. 3B) output by a regulator (not shown). As described above, the voltage calculation unit IC1 illustrated in FIG. 2 is configured to detect an electric potential difference between the output voltage Vout and the reference voltage Vref of the current transformer CT1 and to determine an average value of a square value of the detected electric potential difference, to thereby calculate a square value of the voltage effective value. Moreover, the voltage calculation unit IC1 is configured to calculate a square average value of the voltage effective value for every predetermined period (for example, one full wave, one half wave, or a predetermined fixed period) and to output a calculation result as a Vrms signal to the CPU1 serving as the control unit.

FIG. 3C is an illustration of a waveform 304, which is a voltage waveform of a Zerox signal as an output of the comparator IC2. In FIG. 2, the non-inverting terminal (+) of the comparator IC2 receives the output voltage Vout of the current transformer CT1, and the inverting terminal (−) receives the reference voltage Vref of the current transformer CT1. Then, the comparator IC2 compares the input voltages to the two input terminals and outputs a Zerox signal based on a comparison result. Thus, in FIG. 3B, during the period of from 0 msec to 10 msec and the period of from 20 msec to 30 msec in which the output voltage Vout is higher than the reference voltage Vref, the Zerox signal illustrated in FIG. 3C is at the high level. Meanwhile, during the period of from 10 msec to 20 msec and the period of from 30 msec to 40 msec in which the output voltage Vout is lower than the reference voltage Vref, the Zerox signal illustrated in FIG. 3C is at the low level. It can be seen that, in the waveform 304, rising timings (0 msec, 20 msec, and 40 msec) and falling timings (10 msec and 30 msec) of the waveform coincide with the zero cross (indicated by the arrows) of the AC power supply 201 illustrated in FIG. 3A. Then, the CPU1 can detect zero cross timings of the AC power supply 201 and the frequency of the AC power supply 201 based on the Zerox signal.

[Control Sequence for Power Supply Apparatus]

Figure 4:
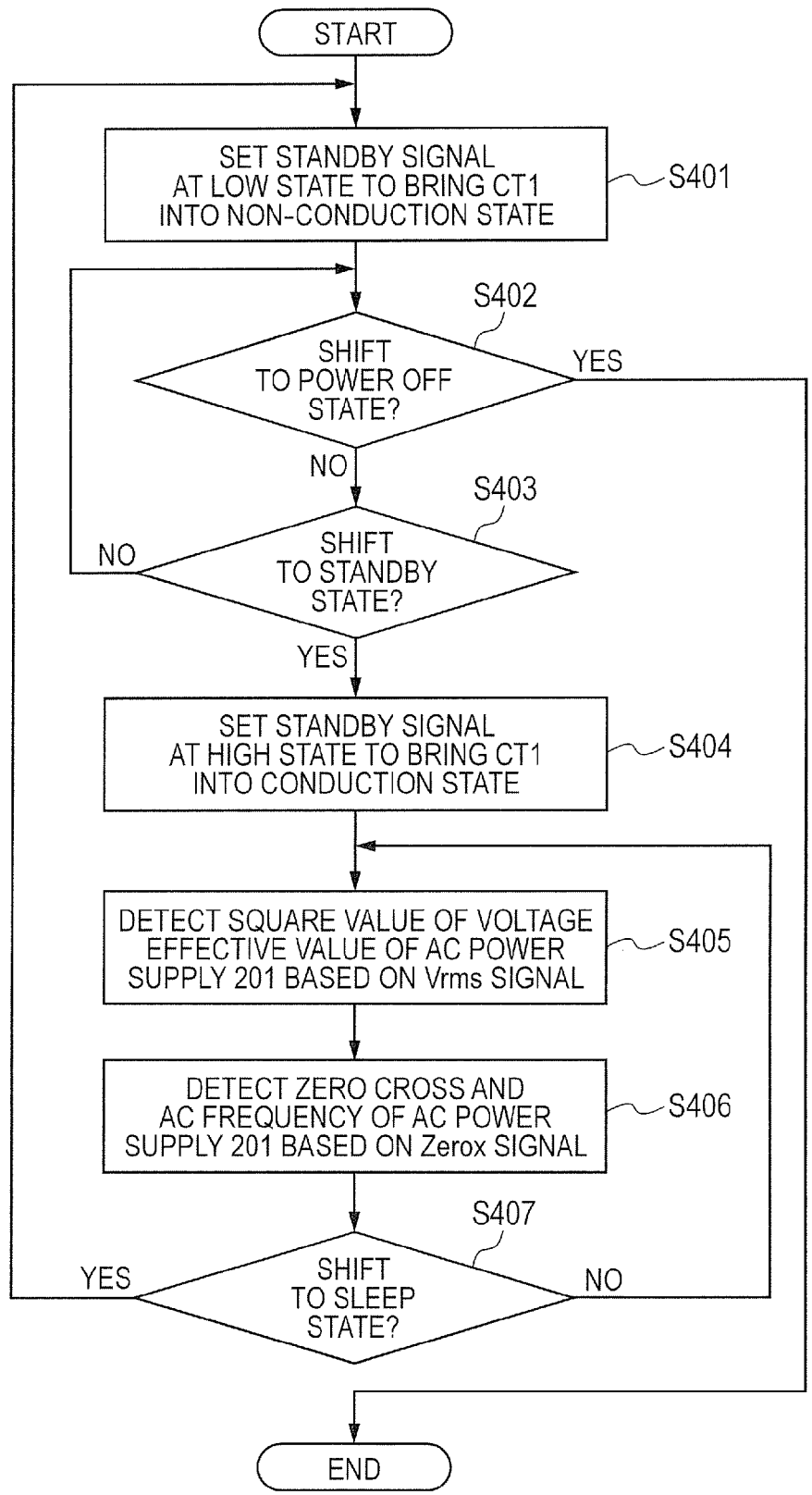
FIG. 4 is a flowchart for illustrating a control sequence for the power supply apparatus according to the first embodiment.

FIG. 4 is a flowchart for illustrating a control sequence for the power supply apparatus 200 of this embodiment. When the power supply apparatus 200 is shifted to the power-on state through a power supply switch (not shown) arranged in the image forming apparatus, a connection with the AC power supply 201 through a power supply cable (not shown), or the like, the control sequence illustrated in FIG. 4 is activated and executed by the CPU1.

In Step S401, the CPU1 sets a standby signal to be in a low level state and cuts off supply of current to the current transformer CT1, to thereby bring the current transformer CT1 into the non-conduction state and shift the state of the power supply apparatus 200 to the first state. As described above, when the standby signal is brought into the low level state, the secondary-side light emitting diode of the photocoupler PC1 is brought into the non-conduction state and prevented from emitting light. As a result, the phototransistor on the primary side of the photocoupler PC1 is also brought into the non-conduction state, and current is prevented from flowing to the base terminal of the transistor Q1, thereby bringing the transistor Q1 into the off-state. Thus, the light emitting diode on the secondary side of the triac coupler SSR1 is brought into the non-conduction state and prevented from emitting light, and the primary-side triac of the triac coupler SSR1 is also brought into the non-conduction state, thereby being brought into the non-conduction state in which current is prevented from flowing to the primary side of the current transformer CT1. The power supply apparatus 200 of this embodiment is shifted to the first state during the sleep state or the power-off state of the power supply apparatus 200 in order to reduce power consumption.

In Step S402, the CPU1 determines whether or not there is a need to shift the power supply apparatus 200 to the power-off state. When the CPU1 determines that there is a need to shift the power supply apparatus 200 to the power-off state, the CPU1 terminates processing. When the CPU1 determines that there is no need to shift the power supply apparatus 200 to the power-off state, the CPU1 causes the processing to proceed to Step S403. In Step S403, the CPU1 determines whether or not there is a need to shift the power supply apparatus 200 to the standby state. When the CPU1 determines that there is a need to shift the power supply apparatus 200 to the standby state, the CPU1 causes the processing to proceed to Step S404. When the CPU1 determines that there is no need to shift the power supply apparatus 200 to the standby state, the CPU1 causes the processing to return to Step S402.

In Step S404, the CPU1 sets the standby signal to be in the high level state and causes current to be supplied to the current transformer CT1, to thereby bring the current transformer CT1 into the conduction state and shift the state of the power supply apparatus 200 to the second state. As described above, when the standby signal is set at the high level, the secondary-side light emitting diode of the photocoupler PC1 is brought into the conduction state to emit light, thereby bringing the phototransistor on the primary side of the photocoupler PC1 into the conduction state. With this, current flows to the base terminal of the transistor Q1 through the phototransistor on the primary side of the photocoupler PC1, the resistor R5, and the diode D1, thereby bringing the transistor Q1 into the conduction state. When the transistor Q1 is brought into the conduction state, current flows into the resistor R4, to thereby bring the light emitting diode on the secondary side of the phototriac coupler SSR1 into the conduction state and bring the primary-side triac of the triac coupler SSR1 into the conduction state. As a result, the current transformer CT1 is brought into the conduction state in which current flows to a primary-side winding through the resistors R1 and R2, thereby bringing the power supply apparatus 200 into the second state of enabling input voltage detection and zero cross detection for the AC power supply 201.

In Step S405, the CPU1 detects a square value of a voltage effective value of the AC power supply 201 based on a Vrms signal output from the voltage calculation unit IC1. In Step S406, the CPU1 detects the zero cross timings and the frequency of the AC power supply 201 based on the Zerox signal output from the comparator IC2. In Step S407, the CPU1 determines whether or not there is a need to shift the power supply apparatus 200 to the sleep state. When the CPU1 determines that there is a need to shift the power supply apparatus 200 to the sleep state, the CPU1 causes the processing to return to Step S401. When the CPU1 determines that there is no need to shift the power supply apparatus 200 to the sleep state, the CPU1 causes the processing to return to Step S405.

As described above, in this embodiment, the current supply path to the current transformer CT1 for use in detection of the voltage from the AC power supply 201 is also used as a discharge path for the X-capacitor C1. Further, the triac coupler SSR1 serving as the switching unit of the current transformer CT1 is also used as a switching unit for use in discharging of the X-capacitor C1. Further, in this embodiment, the output voltage Vout on the secondary side of the current transformer CT1 and the reference voltage Vref are used to detect the zero cross of the AC power supply 201, and hence there is no need to arrange a dedicated circuit for detection of the zero cross. As a result, there can be provided a power supply apparatus which has a voltage detection circuit capable of achieving reduction of power consumption at low cost.

As described above, according to this embodiment, power consumption can be reduced with a simple circuit configuration.

Next, a second embodiment of the present invention is described.

[Configuration of Power Supply Apparatus]

Figure 5:
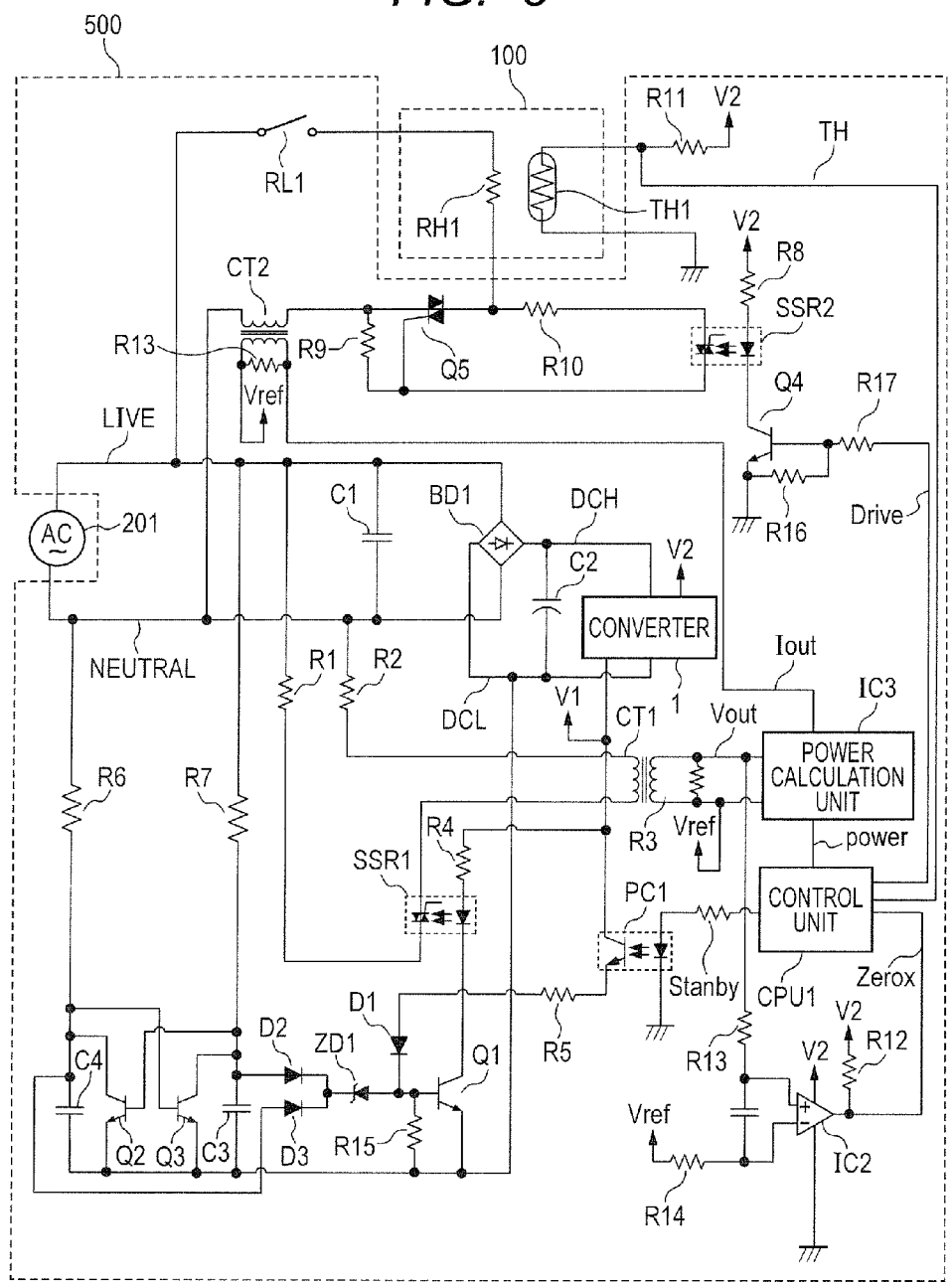
FIG. 5 is a diagram for illustrating a circuit configuration of a power supply apparatus according to the second embodiment.

FIG. 5 is a diagram for illustrating a circuit configuration of a power supply apparatus 500 according to the second embodiment. The circuit configuration illustrated in FIG. 5 is different from the circuit configuration illustrated in FIG. 2 according to the first embodiment in that the following circuit is added. Specifically, in FIG. 5, a current transformer CT2 and a resistor R13 are added in order to detect power supplied to the fixing device 100. Further, the voltage calculation unit IC1 of the first embodiment illustrated in FIG. 2 is changed to a power calculation unit IC3. Other circuit configuration is the same as the circuit configuration of FIG. 2, and hence description thereof is omitted.

A power supply apparatus 500 includes the current transformer CT2 serving as a current detection unit configured to detect a current value of current supplied to the heat generation member RH1 serving as a heater portion for the fixing device 100. A primary side of the current transformer CT2 is connected to the heat generation member RH1 of the fixing device 100, and current which is proportional to current flowing to the heat generation member RH1 of the fixing device 100 is generated on a secondary side of the current transformer CT2. An output voltage Iout generated in the damping resistor R13 by the current generated on the secondary side is voltage which is proportional to the current flowing to the heat generation member RH1 of the fixing device 100, and the output voltage Iout and a predetermined reference voltage Vref are input to the power calculation unit IC3. Further, the secondary-side output voltage Vout of the current transformer CT1 described above is also input to the power calculation unit IC3.

The power calculation unit IC3 is configured to determine a current value of current which flows to the heat generation member RH1 based on a differential value between the output voltage Iout and the reference voltage Vref of the current transformer CT2. Further, the power calculation unit IC3 is configured to determine an input voltage from the AC power supply 201 based on a differential value between the output voltage Vout and the reference voltage Vref of the current transformer CT1. Then, the power calculation unit IC3 multiplies the determined current value and the input voltage, and calculates an average value of the multiplied value, to thereby calculate a power value of power supplied to the heat generation member RH1 of the fixing device 100. Then, the power calculation unit IC3 outputs a power signal indicating the calculated power value to the CPU1 serving as the control unit.

In the voltage detection method using the current transformer CT1 according to the above-mentioned first embodiment, the power being supplied to the fixing device 100 is calculated by the following method. Specifically, the power being supplied to the heat generation member RH1 of the fixing device 100 is calculated indirectly based on the square value of the voltage effective value detected by the current transformer CT1, the resistance value of the heat generation member RH1, and the power duty of power currently being supplied to the fixing device 100. Meanwhile, in this embodiment, power supplied to the fixing device 100 can be detected directly based on the input voltage detected by the current transformer CT1 and a current value of current which flows to the heat generation member RH1 and is detected by the current transformer CT2. Therefore, the power supply value can be detected with high accuracy without being affected by an error in the power duty due to the control by the CPU1 or unevenness in the resistance value of the heat generation member RH1 for use in the fixing device 100. Further, when a resistor temperature coefficient indicating a degree of fluctuation in the resistance value upon a rise in temperature of the heat generation member RH1 is high, unevenness in the resistance value of the heat generation member RH1 becomes larger. However, the supplied power can be calculated with high accuracy even in such a case. Further, in this embodiment, although the resistor heat generation member is used as a heat generation member of the fixing device 100, the configuration of this embodiment can be used as a method of detecting power of the fixing device 100 also in the case where loads such as a capacity load and an inductor other than the resistors are used. As described above, it is possible to provide, through use of the configuration of this embodiment, a power supply apparatus having a power detection circuit capable of achieving reduction of power consumption at low cost, and provide an image forming apparatus including this power supply apparatus.

As described above, according to this embodiment, power consumption can be reduced with a simple circuit configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-179614, filed Sep. 11, 2015, which is hereby incorporated by reference herein in its entirety.

What is claimed is:

1. A power supply apparatus, comprising:
a first line and a secondary line to each of which an AC voltage is input;
a first capacitor arranged between the first line and the secondary line;
a voltage detection unit configured to detect the AC voltage;
a conversion element to be connected to the first line or the secondary line, the conversion element being configured to convert the AC voltage to be input to the first line or the secondary line into a current corresponding to the AC voltage;
a switch configured to switch between connection and disconnection of the voltage detection unit and the conversion element; and
a control unit configured to control the voltage detection unit and the switch,
wherein when the control unit controls the switch to connect the voltage detection unit and the conversion element to form a current path between the first line and the secondary line through the voltage detection unit and the conversion element, the voltage detection unit detects the AC voltage between the first line and the secondary line to discharge an electric charge charged in the first capacitor through the current path.

2. A power supply apparatus according to claim 1,
wherein the voltage detection unit includes a current transformer having a primary winding and a secondary winding,
wherein the conversion element includes:
a first resistor having one end connected to the first line and another end connected to the primary winding of the current transformer; and
a second resistor having one end connected to the secondary line and another end connected to the switch, and
wherein another end of the primary winding of the current transformer to which the first resistor is connected is connected to the switch.

3. A power supply apparatus according to claim 2, further comprising a zero cross detection unit configured to detect a zero cross timing of the AC voltage,
wherein the zero cross detection unit is configured to detect a zero cross timing based on a waveform of the AC voltage output to a secondary side of the current transformer.

4. A power supply apparatus according to claim 1, further comprising a first discharge unit and a second discharge unit,
   wherein the first discharge unit includes a second capacitor charged with an electric charge of the first capacitor,
   wherein the second discharge unit includes a third capacitor charged with an electric charge of the first capacitor,
   wherein when the control unit controls the switch to cut off a connection between the voltage detection unit and the conversion element, and when the AC voltage is input from the AC power supply, the electric charge charged in the second capacitor and the electric charge charged in the third capacitor are alternately discharged in accordance with positive and negative electric potentials of the AC voltage.

5. A power supply apparatus according to claim 4,
   wherein the first discharge unit includes:
   a first transistor having a collector terminal connected to the first line and an emitter terminal connected to the secondary line; and
   the second capacitor connected in parallel between the collector terminal and the emitter terminal of the first transistor,
   wherein the second discharge unit includes:
   a second transistor having a collector terminal connected to the secondary line and an emitter terminal connected to the first line; and
   the third capacitor connected in parallel between the collector terminal and the emitter terminal of the second transistor,
   wherein a base terminal of the first transistor is connected to the secondary line, and
   wherein a base terminal of the second transistor is connected to the first line.

6. A power supply apparatus according to claim 5, further comprising a detection unit configured to detect voltage charged in the second capacitor and the third capacitor,
   wherein when the detection unit detects that the charged voltage is higher than a predetermined voltage, the switch connects the voltage detection unit and the conversion element to cause the electric charge charged in the first capacitor to be discharged.

7. A power supply apparatus according to claim 6,
   wherein the detection unit includes a Zener diode configured to detect that the charged voltage is higher than the predetermined voltage, and
   wherein the predetermined voltage comprises a Zener voltage of the Zener diode.

8. A power supply apparatus according to claim 1,
   wherein the first capacitor is X-capacitor for reducing a noise.

9. An image forming apparatus, comprising:
   an image forming unit configured to form an image on a recording material;
   a fixing unit configured to fix on the recording material the image formed on the recording material; and
   a power supply apparatus configured to supply power to the fixing unit,
   the power supply apparatus comprising:
   a first line and a secondary line to each of which an AC voltage is input;
   a first capacitor arranged between the first line and the secondary line;
   a voltage detection unit configured to detect the AC voltage;
   a conversion element to be connected to the first line or the secondary line, the conversion element being configured to convert the AC voltage to be input to each of the first line or the secondary line into a current corresponding to the AC voltage;
   a switch configured to switch between connection and disconnection of the voltage detection unit and the conversion element; and
   a control unit configured to control the voltage detection unit and the switch,
   wherein when the control unit controls the switch to connect the voltage detection unit and the conversion element to form a current path between the first line and the secondary line through the voltage detection unit and the conversion element, the voltage detection unit detects the AC voltage between the first line and the secondary line to discharge an electric charge charged in the first capacitor through the current path.

10. An image forming apparatus according to claim 9,
    wherein the fixing unit includes a heat generation member configured to heat an image formed on a recording material,
    wherein the control unit is configured to calculate an amount of power supplied to the heat generation member based on a value of the AC voltage detected by the voltage detection unit, a resistance value of the heat generation member, and a power duty of power supplied to the heat generation member.

11. An image forming apparatus according to claim 10,
    wherein the power supply apparatus includes a current detection unit configured to detect current which flows through the heat generation member, and
    wherein the control unit is configured to calculate an amount of power supplied to the heat generation member based on a current value of current detected by the current detection unit and a value of the AC voltage detected by the voltage detection unit.

12. An image forming apparatus according to claim 11,
    wherein the current detection unit includes a current transformer having a primary winding and a secondary winding, and
    wherein the primary winding is connected to a power supply passage configured to supply power to the heat generation member.

13. An image forming apparatus according to claim 9,
    wherein the power supply apparatus includes a power supply unit configured to convert the AC voltage into a DC voltage and output the converted DC voltage, and
    wherein the DC voltage output from the power supply unit is supplied to the image forming unit.

14. An image forming apparatus according to claim 9,
    wherein the first capacitor is X-capacitor for reducing a noise.

* * * * *